United States Patent [19]
Matthews et al.

[11] 3,814,484
[45] June 4, 1974

[54] ELECTRONIC BRAKE CONTROL SYSTEM
[75] Inventors: William J. Matthews, Rochester; Samuel J. Macano, Macedon, both of N.Y.
[73] Assignee: General Signal Corporation, Rochester, N.Y.
[22] Filed: Jan. 19, 1973
[21] Appl. No.: 324,941

Related U.S. Application Data
[62] Division of Ser. No. 155,186, June 21, 1971, abandoned.

[52] U.S. Cl. .......................... 303/20, 303/3, 303/15
[51] Int. Cl. ........................................... B60t 13/68
[58] Field of Search ............ 188/3 R, 181 T; 303/3, 303/7, 15, 20, 21

[56] References Cited
UNITED STATES PATENTS
3,402,972   9/1968   Cooper et al. ..................... 303/20
3,507,542   4/1970   Cannella ............................. 303/7

*Primary Examiner*—Milton Buchler
*Assistant Examiner*—Stephen G. Kunin
*Attorney, Agent, or Firm*—Milton E. Kleinman; Harold S. Wynn

[57]         ABSTRACT

A control system operates electro-pneumatic braking apparatus on a vehicle and includes an actuator for producing a signal proportional to desired braking effort from full release mode to a maximum. Sensor apparatus is responsive to a pneumatic parameter of the braking system for producing a signal indicative of the actual brake pressure while summing apparatus is responsive to the actuator apparatus and the sensor apparatus for producing outputs effective to operate the braking apparatus to release, apply, and lap modes in accordance with a selected difference in magnitude between the actuator apparatus and sensor apparatus signals.

5 Claims, 4 Drawing Figures

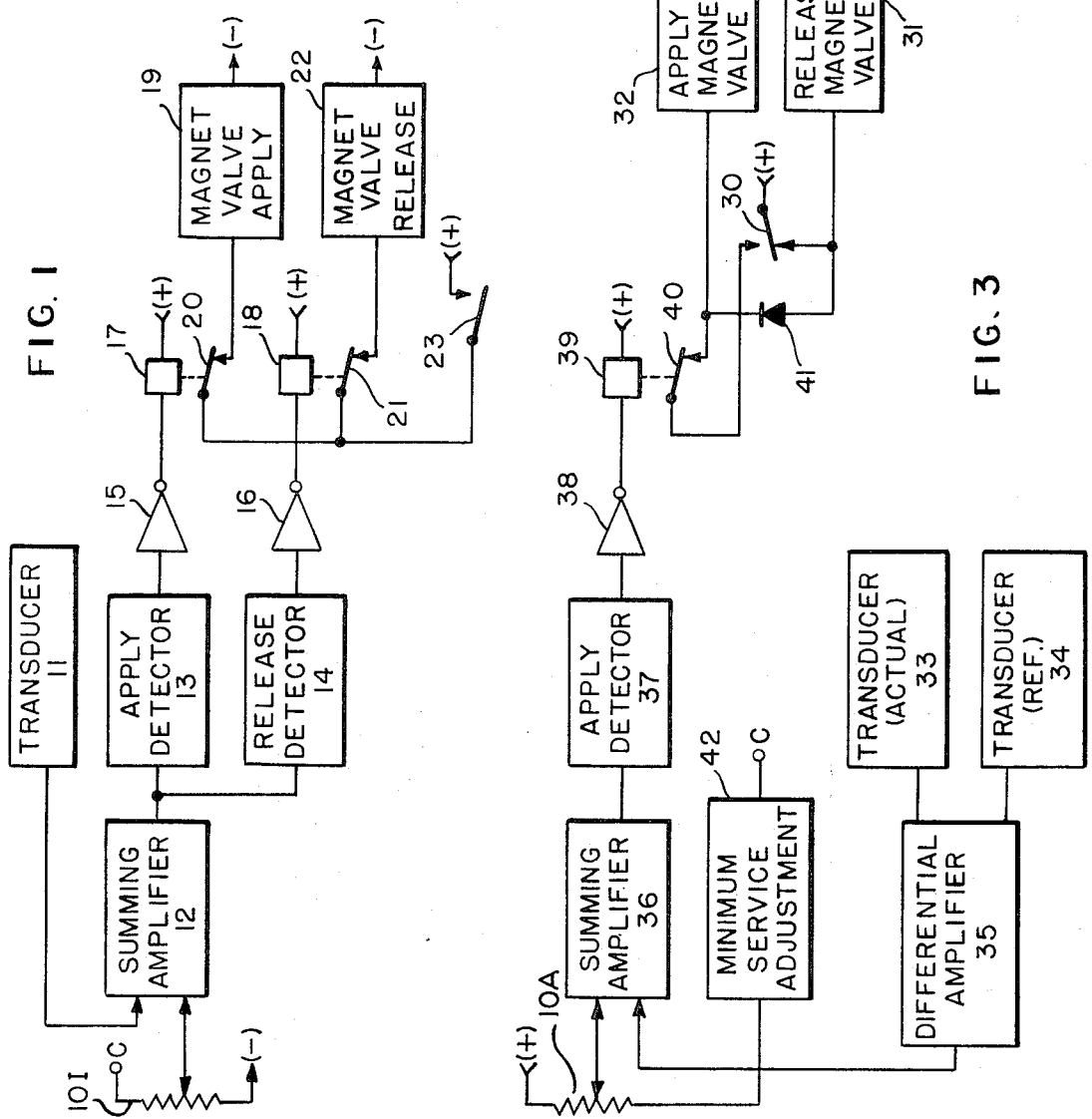

ELECTRONIC BRAKE CONTROL SYSTEM

This is a division of application Ser. No. 155,186 filed June 21, 1971, now abandoned.

BACKGROUND OF INVENTION

The invention while subject to a wide range of applications, is especially suited for use in an electronic brake control system and will be particularly described in that connection.

Brake control systems on railroad vehicles in general include a control apparatus for operating a number of control valves which either increase or decrease the brake line pressure for respectively releasing and applying the brakes along the train. In addition there are usually two systems involved. One is generally designated as an automatic, for the control of the entire train braking apparatus and the other, independent which controls only the brakes on the locomotive. In order to accomplish this in a pneumatic system, a particularly complex system of valves and pipe fittings must be incorporated. In addition two such systems must be provided on certain kinds of locomotives in order to permit reverse running. These control systems are consequently extremely expensive, rather bulky, taking up a great deal of room in the locomotive cab and subject to relatively expensive and frequent maintenance requirements associated with pneumatic systems.

Electrical systems, on the other hand, are less cumbersome and require a minimum amount of space while providing the necessary functions associated with the prior systems. In addition, by means of electrical interlocking the two control points in the cab may be provided as with a pneumatic system without the additional expense of a second brake stand.

It is therefore an object of the present invention to provide a system which substantially obviates one or more of the limitations and disadvantages of the described prior arrangements.

It is another object of the present invention to provide a simplified arrangement which utilizes the advantages of electronic control.

It is another object of the present invention to provide a more economical means of controlling the brakes on a vehicle.

SUMMARY OF INVENTION

There has been provided a control system for operating electro-pneumatic braking apparatus on a vehicle which includes actuator means for producing a signal proportional to a desired braking effort from a full release mode to a maximum. Sensor means responds to pneumatic parameter of the braking system and provides a signal indicative of the actual brake pressure, while summing means responds to the actuator means and the sensor means for producing outputs effective to operate braking apparatus to release, apply and lap modes in accordance with a selected difference in magnitude between the actuator means and sensor means signals.

For a better understanding of the present invention, together with other and further objects thereof, reference is had to the following description taken in connection with the accompanying drawing, while its scope will be pointed out in the appended claims.

DESCRIPTION OF THE DRAWING

FIG. 1 is a diagram of an independent brake control system;

FIG. 2 is a table illustrating operating conditions of apparatus of FIG. 1;

FIG. 3 is a diagram of an automatic brake control system according to a preferred embodiment of the present invention; and FIG. 4 is a table illustrating operating conditions of apparatus of FIG. 3.

DESCRIPTION OF THE PREFERRED EMBODIMENT

The control system of the present invention includes two types of brake control apparatus. The first is used to control the operation of the locomotive brakes only and is referred to as the independent brake control section. Second, is used to control the brakes on the cars following the locomotive and is referred to as the automatic brake control section.

In the railroad industry braking systems must comply to certain standards of performance not the least of which are safety considerations including the implementation of safe-failure modes. Pneumatic or air brake systems for railroad vehicles work on the principle that if air pressure in the system is reduced by a certain amount the brakes should be applied to some designated braking effort. If, for example, one of the brake lines on the vehicle burst releasing or lowering the air pressure in the system, the train braking system would immediately fall into an emergency brake mode wherein all the brakes on each of the cars would immediately be applied in order to stop the train before it would be impossible to do so. This principle is carried over to the control of the brakes by reducing brake line pressure in varying amounts depending upon the degree of effort desired.

In the present system, both in automatic and independent modes, a potentiometer, respectively labeled 10-A (see FIG. 3) and 10-I (see FIG. 1) for the automatic and independent modes, is manually operable to provide a signal indicative of a desired braking effort. In the independent system for operating the locomotive brakes, a transducer 11 senses the brake line pressure and provides a signal proportional thereto to a summing amplifier 12. An input from the potentiometer 10-I is also provided to the amplifier 12, and a comparison is made for providing an output to apply and release detectors, respectively labeled 13 and 14. The output of the summing amplifier 12 is positive in polarity if the brake pressure as detected by the transducer 11 is less than the demand pressure as provided by the signal from potentiometer 10-I, and negative if the pressure is greater than the demand pressure, with a zero output if both demand and actual pressure are equal. Apply and release detectors 13 and 14 compare the output of the amplifier 12 with a bias value which is used to establish a dead band of lap mode of braking operation.

The outputs of apply and release detectors 13 and 14 respectively are used to turn on or off associated relay drivers 15 and 16. These drivers in turn each drive associated relays labeled respectively 17 and 18.

If a brake application is desired, the brake handle is actuated which, in turn, establishes a signal level for potentiometer 10-I. This provides an input to the inverting input of summing amplifier 12, i.e., a negative voltage proportional to the desired braking pressure. The output of amplifier 12 is therefore positive for a negative input. When the output of summing amplifier 12 achieves a positive voltage equal to a present negative reference voltage established for the apply detector 13, the apply detector output switches from some positive value to a small negative voltage. This voltage change is sensed at relay driver 15 which is an inverting amplifier stage, the output of which drives a relay 17 which is coupled to a positive bus, as can be seen in the drawing. When the input of the relay driver 15 goes negative the relay 17 known as the apply relay is de-energized and an apply magnet valve 19 is energized through the back contact 20 of relay 17.

If the output of summing amplifier 12 is positive the output of release detector 14 will be established at a small negative voltage also, but this is due to the fact that the release detector 14 has a positive reference voltage associated therewith. The relay driver 16 associated with release detector 14 receives a negative input which is inverted and coupled through relay 18 to a positive bus, this causes relay 18 to become de-energized. De-energization of relay 18 causes magnet valve 22 to become energized which, in accordance with the table T-1 is proper for an apply mode. Both magnet valves 19 and 22 are energized externally from a positive bus through contact 23 which is mounted on the actuator 10-I and which is closed whenever the actuator is at other than a release position. When relay contacts 20 or 21 become closed to their back positions and the brake handle, which operates the potentiometer 10-I, is in an apply position, contact 23 supplies the energy to energize both magnet valves 19 and 22.

As the brakes are applied on the vehicle by energization of the magnet valve 19, the brake pressure increases towards the pressure demanded by the actuator 10-I, the transducer 11, which senses the brake pressure, provides an output which increases positively to a voltage proportional to the pressure. The output of the transducer 11 is summed with the demand voltage of the actuator 10-I in the amplifier 12, and when the demand pressure is achieved the output of summing amplifier 12 becomes zero. A zero voltage output from the amplifier 12 causes the output of the apply detector 13 to shift positive and the output of release detector 14 to remain negative. These respective outputs in turn cause the apply relay 17 to be energized and the release relay 18 to be de-energized. Under these conditions the apply magnet valve 19 is dropped or deactivated and the release magnet valve 22 remains activated. In accordance with the table T-1 of FIG. 2, the lap position has now been achieved, that is, with the apply magnet valve de-energized and the release magnet valve energized.

If the brake pressure demand is reduced by a reduction in the actuator signal, the output of the summing amplifier 12 will be shifted negative because the pressure transducer signal 11 is greater than the output of the actuator 10-I. A negative input on apply detector 13 is inverted to a positive voltage which, in turn, is inverted by amplifier 15 to a negative voltage which energizes the relay 17 holding the magnet valve 19 in a de-energized condition. The negative output of amplifier 12 is imposed on the release detector 14 which inverts the signal and provides a positive voltage to amplifier 16 which again inverts the signal to a negative output for energizing the relay 18 to the positive bus. Energization of relay 18 opens back contact 21 and activates the release magnet valve 22 which follows the conditions set forth in Table T-1.

The switch 23 controlled by the brake handle on the actuator 10-I is closed in all apply positions so that if the brake pressure demand were again increased the magnet valves 19 and 22 could be energized to comply with the table T-1 of FIG. 2.

The automatic brake control apparatus regulates the operation of the brakes on the train. The table of FIG. 4 recites the conditions necessary for operating the magnet valve associated with the automatic brake control section.

The automatic brake section of the control system disclosed herein has three input parameters and it operates in a different fashion from the independent brake section. One input is as recited with respect to the independent section, that is the demand voltage established by the actuator 10-A shown schematically in the form of a potentiometer. The voltage output of the actuator 10-A ranges from near zero volts in a release position to a small positive voltage in the full service position. The full service or apply position provides a substantial brake type pressure reduction which, in the present example, is 25 psi. A minimum service reduction is also obtainable of approximately 4 psi, which is a threshold position that provides an adequate pressure differential for on-car sensing for application and release of the brakes around the desired braking effort. The automatic brake section is different from the independent section in that the brakes can be applied in discrete steps but can only be released if the brake handle is moved to the release position. In this position a switch 30 is closed to its back position for energizing release and apply magnet valves 31 and 32, respectively, through a direct circuit.

The other inputs mentioned are provided from pressure transducers 33 and 34 which monitor the actual brake line pressure and a regulated output or reference pressure provided at the input to the brake lines. These transducers 33 and 34 provide inputs to differential amplifier 35 which may be a unity gain amplifier with output of a selected negative voltage for full service application and zero for full release. It should be noted that transducers 33 and 34 and amplifier 35 may be incorporated in a single differential pressure transducer if desired. The output of differential amplifier 35 is used as one input to summing amplifier 36 which is similar to that described with respect to the independent section. Another input to summing amplifier 36 is provided by the actuator 10-A.

The output of summing amplifier 36 swings negative if the reduction in brake pressure as sensed by the actual pressure transducer 33 is less than that demanded by the actuator 10-A. This negative output is coupled to the apply detector 37 which has a reference voltage adjustable to some small positive value. As the reference voltage is increased in a positive direction the sensitivity of the apply detector increases and consequently the brake actuator handle becomes less effective to finally regulate the application of the brakes. The apply detector 37 has included therein a variable hysteresis potentiometer which provides small dead band of pressures to be introduced into the control which minimizes the magnet valve clatter about the desired pressure. When the input to apply detector swings positive sufficiently it overcomes the reference level previously set and the output swings positive which is inverted by amplifier 38 and a negative output is coupled through the coil of relay 39 to the positive bus. Energization of relay 39 opens back contact 40 and de-energizes the apply magnet valve 32 which according to Table T-2 is one condition for proper application of the vehicle brakes. In order to fulfill the second condition for the Table T-2 release magnet valve 31 must also be de-energized. The relay contact 30 is only closed to the back contact position as shown when the brake actuator handle associated with the actuator 10-A is in the full release position. Therefore, if the brake handle on the actuator has been applied the contact 30 is shifted to its forward position and release magnet valve 31 becomes de-energized. Diode 41 is provided in order to prevent energization of the release magnet valve 31 from front positive voltage through, contact 30, back contact 40 to the release magnet valve 31.

Oftentimes there are numerous leaks in pneumatic systems and it is possible for the reduction in brake pressure to be greater than that demanded. Under these conditions the output of differential amplifier 35 is compared with the output of actuator 10-A which causes the summing amplifier 36 to swing positive which, in turn, is inverted in apply detector 37 to a negative voltage. And, again, inverted for de-energizing the relay 39. The difference between the pressure sensed by the actual pressure transducer 33 and reference pressure transducer 34 is detected in the differential amplifier and the resulting signal is an indication of the true reduction in brake pipe pressure. For example, if the reference pressure or regulated pressure is 80 psi and a full service reduction 25 psi is called for the output of differential amplifier 35 begins to swing negative. However, since the input from the actuator 10-A is greater than the input from the amplifier 35 a negative output is generated by summing amplifier 36 which, in turn, causes energization of the relay 39 for de-energizing magnet valve 32. The voltage generated or provided at the output of the actuator 10-A represents some selected differential between the actual and reference pressures and as the actual pressure decreases to that called for by the actuator 10-A the output of differential amplifier 35 finally achieves a value sufficient to overcome the input of the actuator 10-A for driving the summing amplifier to a positive output, which subsequently de-energizes relay 39 and picks up magnet valve 32. It should be noted that the release magnet valve is de-energized under these conditions and the conditions for the table of FIG. 4 are set for a lap mode of operation.

If the actuator 10-A is pulled to the extreme release position contact 30 is closed to its back contact position for energizing relay release magnet valve 31, and magnet valve 32 via diode 41 in accordance with the conditions set forth in the table of FIG. 4 for a release condition.

A minimum service adjustment block 42 is incorporated into the system in order to set some bias on the potentiometer 10-A so that the brakes may only be applied if some minimum brake pipe reduction is called for. This is in the nature of a threshold setting in order to insure a positive application of the brakes.

The advantages of the invention described herein are particularly beneficial to those interested in applying the system to railroad vehicles, in that an enormous amount of pneumatic equipment, including pressure sensitive valves and the like, are eliminated and the braking system may be operated from either side of the locomotive cab without the necessity for duplicating the pneumatic apparatus. All that is necessary is an electrical interlock so that the operator of the braking system can control the system from one point or another. Duplication of the electronics is obviously not necessary with such an arrangement. This system also provides the convenience of less frequent maintenance requirements since there are less points of wear due to the elimination of many mechanical and pneumatic components.

While there has been described what at present is considered to be the preferred embodiment of the invention, it will be obvious to those skilled in the art that various changes and modifications may be made therein without departing from the invention and it is therefore intended in the appended claims to cover all such changes and modifications as fall within the true spirit and scope of the invention.

What is claimed is:

1. A control system for operating electropneumatic braking apparatus on a vehicle comprising:
    a. actuator means for producing a signal polarized and proportional to a desired braking effort from a full release mode to a maximum;
    b. sensor means comprising actual brake control pressure and reference pressure transducers responsive to respectively different pneumatic parameters of the braking apparatus for producing associated signals representative of actual and reference brake pressure signals;
    c. summing means responsive to the sensor means and the actuator means for producing outputs effective to operate the braking apparatus selectively to release, apply and lap modes in accordance with differences in magnitude and polarity of said actuator and sensor means signals.

2. The control system of claim 1 wherein said actuator means comprises: a manually operable potentiometer for producing signals of varying magnitude indicative of a desired braking and release effort and a switch means for respectively changing the polarity of the actuator output in accordance with whether a release or braking effort is called for.

3. The control system of claim 2 wherein said summing means comprises:
    a. a differential amplifier governed by the sensor means for producing signals of a first or second character in accordance with whether the actual signal is respectively greater or less than the reference by a selected difference in said signals, indicative of release and apply modes; and the lap mode if within said selected difference;
    b. summing amplifier means responsive to the outputs of the actuator means and differential amplifier for producing a signal proportional to a desired braking effort;
    c. output means responsive to the switch means and the summing amplifier for producing the lap, apply and release mode signals in accordance with the polarity of the switch means and the character of the desired braking effort signal.

4. A control system for operating electropneumatic braking apparatus on a vehicle comprising:

a. actuator means for producing a signal polarized and proportional to a desired braking effort from a full release mode to a maximum;
b. sensor means responsive to pneumatic parameters of the braking apparatus for producing associated signals representative of actual and reference brake pressure signals;
c. said sensor means including a first and a second pressure sensitive transducer means, said first pressure sensitive transducer means responsive to normally regulated pneumatic inputs to the braking system for producing the reference brake pressure signal, and said second pressure sensitive transducer means responsive to actual pneumatic pressure exerted in the braking system for producing the actual brake pressure signal;
d. summing means responsive to said first and second pressure sensitive transducer means and the actuator means for producing outputs effective to operate the braking apparatus to release, apply and lap modes in accordance with selected differences in magnitude and polarity of signals from said actuator and said first and second pressure sensitive transducer means.

5. The control system of claim 4 wherein said summing means comprises:
a. a differential amplifier governed by the sensor means for producing signals of a first or second character in accordance with whether the signal of said second pressure sensitive transducer means is respectively greater or less than the signal of said first pressure sensitive transducer means by a selected difference in said signals, indicative of release and apply modes; and the lap mode if within said selected difference;
b. summing amplifier means responsive to the outputs of the actuator means and differential amplifier for producing a signal proportional to a desired braking effort;
c. output means responsive to the sensor means and the summing amplifier for producing the lap, apply and release mode signals in accordance with the polarity of the switch means and the character of the desired braking effort signal.

* * * * *